July 14, 1959  J. A. FAVRE  2,895,033
CURRENT-CARRYING HINGE CONSTRUCTION
Filed June 17, 1955
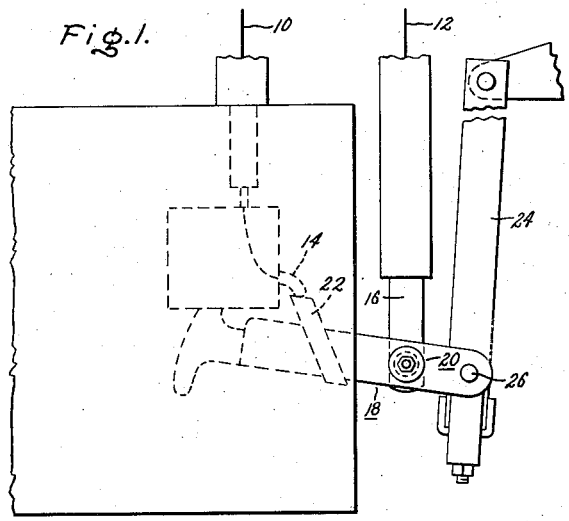
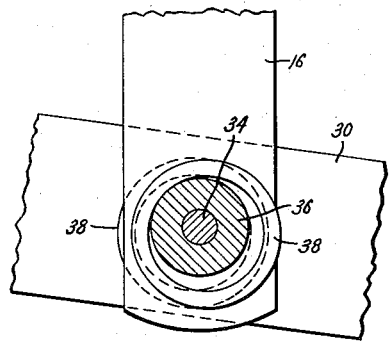
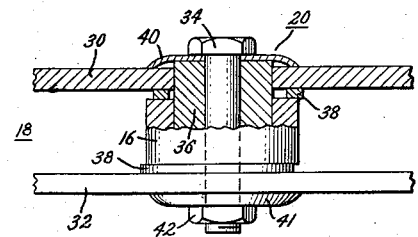
Inventor:
John A. Favre,
by J. Wesley Hauber
His Attorney.

United States Patent Office 2,895,033
Patented July 14, 1959

2,895,033

CURRENT-CARRYING HINGE CONSTRUCTION

John A. Favre, Broomall, Pa., assignor to General Electric Company, a corporation of New York Application June 17, 1955, Serial No. 516,187

13 Claims. (Cl. 200—170)

This invention relates to a current-carrying hinge construction for electric apparatus such as a power circuit breaker and, more particularly, to a hinge which includes sliding surfaces through which electric power is transmitted.

Frequently, it is necessary to transmit large quantities of electric power through the sliding surfaces of a hinge joint. For example, in the electric circuit breaker claimed in U.S. Patent 2,639,354, issued to E. J. Frank and assigned to the assignee of this invention, there is shown a movable contact arm pivotally mounted on a conductive stud by means of a hinge joint. This hinge joint comprises sliding surfaces on the contact arm and the stud through which large quantities of electric power must be transferred. To enable such power transfer, it has been customary heretofore to coat adjacent surfaces of the contact arm and the stud with a heavy layer of silver, or other highly conductive material. These coatings usually have been applied either by a plating operation or by imbedding suitable inserts into the adjacent surfaces. Suitable spring means have been provided for urging these coated surfaces into high-pressure, current-carrying engagement.

Such arrangements, while satisfactory for general application, have not been entirely satisfactory for those applications in which the breaker is subject to frequent operations. In this latter type of application, the sliding contact surfaces occasionally have become prematurely and undesirably worn, as by eroding, galling, and welding, and as a result, premature failure of the joint has occurred. Normally, these destructive wearing processes are inhibited by lubricant initially applied to the contact surfaces, but should this lubricant supply become exhausted, these destructive processes occur at a highly accelerated rate.

This problem can be overcome to a certain extent by providing the hinge with a suitable lubricating system, but such systems are unduly expensive and complicated. Another disadvantage of using a joint which requires lubrication is that the lubricating film between the contact surfaces tends to collect foreign matter and also tends to act as an insulator which can undesirably increase the electrical resistance of the joint.

Accordingly, it is a primary object of my invention to provide a current-carrying hinge which is capable of efficient and prolonged operation without the need for lubricant between its sliding surfaces.

Another object of my invention is to construct the hingle joint in such a manner that those parts which are subject to excessive wear may be easily and quickly replaced with a minimum of expense.

In accordance with one form of my invention, two contact members of the hinge joint are mounted for relative pivotal movement by means of a pivot pin extending transversely therebetween, and a floating washer is mounted about the pivot pin with sufficient clearance to permit appreciable lateral and rotative movement of the washer with respect to the pivot pin in response to relative movement of said contact members. The washer is provided with transversely-spaced faces which intimately contact said contact members in current-carrying relationship, and these faces are composed of a highly conductive material which, when wiped by the surfaces of said contact members, has a lesser resistance to wear than the material of said surfaces.

For a better understanding of my invention reference may be had to the following description taken in connection with the accompanying drawing in which Fig. 1 is a side elevational view showing a circuit breaker comprising a hinge structure constructed in accordance with my invention; Fig. 2 is an enlarged view of the hinge with a portion thereof removed for clarity, whereas Fig. 3 is a plan view of the hinge with a portion thereof in section.

Referring more particularly to Fig. 1, there is shown a power circuit breaker of the type claimed in the heretofore-mentioned Frank patent, 2,639,354. This circuit breaker comprises a pair of spaced-apart terminals 10 and 12, the first of which is electrically connected to a stationary contact 14 and the second of which is electrically connected to a downwardly extending conductive stud 16. A movable conductive switch arm 18 is pivotally mounted at the lower end of the stud 16 by means of a current-carrying hinge joint 20, which will soon be described in greater detail. At its outer end, the switch arm 18 carries suitable circuit-controlling contacts such as the upwardly projecting contact 22 which is shown in closed position. In this closed position, the contact 22 engages the stationary contact 14 and provides a continuous current path between the stationary contact and the switch arm.

Circuit interruption is effected by moving the switch arm counterclockwise about the hinge joint 20 thereby separating the contacts 14 and 22. The circuit can be reestablished simply by returning the arm 18 in a clockwise direction to the closed position shown. Motive forces for producing these opening and closing operations are supplied to the switch arm 18 through a reciprocable operating rod 24 which is pivotally joined to the switch arm at 26. This operating rod 24, which is of insulating material, is actuated by means of a suitable operating mechanism (not shown). Since the details of this operating mechanism as well as those of the circuit-controlling contacts form no part of the present invention and may be conventional, further description thereof is deemed unnecessary.

It should be apparent from the above description that the hinge joint 20 is required not only to provide a low-friction mounting for the movable switch arm 18 but is also required to carry all of the current which flows between the terminals 10 and 12 of the circuit breaker. To enable the joint to meet these requirements, it has been the practice heretofore to coat adjacent surfaces of the stud and the switch arm with a heavy layer of hard silver, applied either by plating or by imbedding or otherwise securing suitable inserts into the surfaces. Suitable biasing means acting transversely of the hinge have been provided for urging these coated surfaces into high-pressure, current-carrying engagement.

Such arrangements, while satisfactory for general application, have not been entirely satisfactory for those applications in which the breaker is subject to frequent operations. In this latter type of application, the sliding contact surfaces occasionally have become prematurely and undesirably worn as by eroding, galling and welding, and as a result, the hinge joint has failed to perform in the desired manner. Normally, this undesirable erosion, galling, and welding is inhibited by lubricant initially applied to the sliding contact surfaces, but should this lubricant supply become exhausted, these breakdown processes occur at a highly accelerated rate.

This problem is an especially troublesome one where the sliding surfaces are subject to oscillatory motion, as in the disclosed circuit breaker. Oscillatory motion has an appreciably greater tendency to cause galling and welding than rotational movement.

The problem can be overcome to a certain extent by providing the hinge with a suitable lubricating system, but such systems are unduly expensive and complicated. Another disadvantage of using a joint which requires lubrication is that the lubricating film between the contact surfaces tends to collect foreign matter and tends to act as an insulator which can undesirably increase the electrical resistance of the joint.

To overcome the above problems, I have constructed my hinge joint 20 in such a manner that it is capable of effective and prolonged operation without the need for lubricant between its sliding surfaces. This hinge construction is best seen in Figs. 2 and 3 wherein the switch arm 18 is shown as comprising a pair of contact segments 30 and 32 which are pivotally connected to the stud 16 by means of a transversely extending pivot bolt 34. Encircling this pivot bolt 34 is an annular bearing sleeve 36 which fits freely into suitable registering apertures provided in the contact segments 30 and 32.

Between each pair of adjacent surfaces on the stud 16 and the contact segments 30, 32, I provide a floating annular washer 38 which surrounds pivot structure 34, 36 with sufficient clearance to permit appreciable lateral and rotative movement of the washer relative to the pivot structure 34, 36. The transversely-spaced faces of each washer 38 intimately contact the adjacent surfaces of the stud 16 and the contact segment 30 or 32 in effective current-carrying relationship. The contact pressures between these surfaces are controlled by suitable biasing means acting transversely of the joint to resiliently urge the parts thereof together. As shown in Fig. 3, this biasing means comprises a pair of dished resilient washers 40 and 41 which bear against the outer sides of the contact segments 30 and 32. One of these dished washers 40 is disposed beneath the head of a pivot bolt 34 whereas the other is disposed beneath a nut 42 suitably mounted on the bolt. The compressive forces exerted by these washers 40 and 41 are, of course, dependent upon the extent to which the nut 42 is tightened. In accordance with my invention, the bearing sleeve 36 is of sufficient length to limit these compressive forces to a value beneath that which would prevent the floating washers 38 from shifting laterally and circumferentially in response to operation of the switch arm 18, as is desired. Thus, the floating washers 38 are free to shift at random in response to relative movement between the contact segments 30, 32 and the stud 16. These latter parts are frequently termed "contact members" hereinafter.

Repeated tests have demonstrated that permitting the washer to float in the above manner instead of securing it to one of the adjacent contact members or instead of confining its movement to a closely defined circular path has greatly reduced the tendency of the sliding, current-carrying surfaces to gall and erode. Even without lubrication, i.e., with the sliding surfaces essentially dry, I have found that this floating-washer type of hinge is capable of trouble-free performance for the entire normal life of the breaker. As a matter of fact, even after a number of breaker operations amounting to twice the number normally expected, the sliding contact surfaces have remained in excellent condition.

My tests have demonstrated that these results can be most advantageously obtained by constructing the floating washer of a material which, when wiped by the surfaces of the stud 16 and segments 30 and 32, has a lesser resistance to wear than the material of these surfaces. The following is a specific example. With the stud and the contact segments each constructed of copper and the hinge surfaces thereof silver plated, excellent results have been obtained by using a washer consisting of a generally homogeneous sintered mixture of, by weight, 78 percent silver, 20 percent tungsten, and 2 percent free carbon. After an extended series of tests simulating twice the number of operations normally expected for the life of a breaker such as shown in Fig. 1, I have found that, typically, such washers have worn only about .002 of an inch. It was found that the planar configuration of the washer faces was maintained substantially intact, and erosion or pitting of these surfaces was scarcely perceptible. It was also found that the silver plated surfaces of the stud 16 and the contact segments 30, 32 were subjected to essentially no wear. As a matter of fact, in a number of cases, it was found that these surfaces acquired a superficial additional coating of silver and tungsten from the floating washer. Most important, these tests were run without any lubrication being applied to the sliding surfaces.

Although, from a wear-resistance viewpoint, the above-described sintered mixture has provided my best observed performance characteristics, I have found that the tungsten content of the mixture can be widely varied without appreciably impairing this resistance to wear. I prefer, however, that the tungsten content be less than about 30 percent by weight of the mixture. My tests indicate that the tungsten content of the mixture should not exceed a minor percentage thereof by weight, i.e., should be less than 50 percent thereof by weight. Otherwise, the electrical resistance of the joint exceeds permissible limits. My tests further indicate that although the free carbon content can be lowered appreciably, it should not be raised above about three percent. Otherwise, the material of the washer becomes excessively friable and tends to crumble under operating conditions.

Both the tungsten and the free carbon used in the mixture serve as weld-inhibitors between the sliding surfaces. This weld-inhibiting action appears to be due primarily to the high melting and boiling temperatures of these additives. The amount of free carbon used is materially below that value which would produce any significant lubricating film on the sliding surfaces.

Even though slightly increased wear does result from decreasing the tungsten content from the preferred 20 percent, I have found that satisfactory results are obtained even if the tungsten additive is entirely eliminated. Under such circumstances, the free carbon additive alone can be relied upon to impart the desired wearing qualities to the sintered washer. For example, I have obtained exceptionally good results without applied lubrication by using a floating washer formed of a sintered mixture of 99 percent silver and 1 percent free carbon, by weight. My tests indicate that an amount of carbon even less than 1 percent will produce similar good results. The wearing qualities were essentially unchanged when the free carbon content was increased to 2 percent. However, further increases in the carbon content significantly impaired the wearing qualities. For example, washers with a three percent carbon content produced barely acceptable performance; whereas washers with 5 and 7 percent free carbon produced totally unacceptable performance. The faces of these latter washers began to powder and crumble after a relatively small number of breaker operations. This produced unacceptable erosion of the contact surfaces long before the expiration of normal expected life of the breaker. It appears that about three percent is the maximum permissible amount of free carbon, by weight, which should be contained in the mixture if these undesirable results are to be held within acceptable limits.

Another combination which failed to provide entirely satisfactory performance under practical conditions was one in which both the washer and the contact surfaces were formed of silver without any additives. Any localized high pressure areas, such as produced by slight misalignment between the parts, caused destructive galling to occur prematurely in such joints.

In addition to testing the above-mentioned materials for use in the floating washer of my invention, tests were also conducted in which washers of these same materials were suitably secured to the adjacent contact surfaces. These washers which were so secured permitted erosion and galling to a much greater extent than corresponding washers which were permitted to float. In many cases with the washers so secured, the hinge failed after only 15 to 20 percent of the number of operations over which the corresponding floating washer performed successfully.

I attribute the success of my floating-washer type hinge to several factors. First of all, causing the washer to depart from a closely-defined path enhances the ability of the washer to maintain planar, polished surfaces and inhibits any tendency of the washer periphery to form a groove in the adjacent surfaces. Such polished, planar surfaces are, of course, highly resistant to wear. Still further, since the washer is permitted to move both lateraly and circumferentially, its sliding faces wipe over an appreciably larger area of the stud and the contact segments than that of the faces themselves. The result is that, over a period of time, the average load-carrying duty imposed upon the available surfaces of the stud and contact segment is distributed over an appreciably larger area than is the case with the washer faces, the entire area of which are always under load. This alone produces a tendency for the wear which does occur to affect only the washer. But combined with this is the fact that the material of the washer is selected to have a lesser resistance to wear than the material of the contacted surfaces of the stud 16 and the contact segments 30, 32. This, too, tends to cause the wear which does occur to affect only the washer.

In most cases the slight amount of wear which does occur in my hinge joint is unobjectionable and does not significantly impair the performance of the hinge. However, in the remote event that renewal of the hinge does become necessary, this can be accomplished simply by replacing the washers since these are the only parts of the hinge which are subjected to significant wear. Obviously, this renewal process involves only a small fraction of the expense heretofore involved in replacing the entire worn contact segment or stud, which actually had been required where these parts were plated and contacted each other. Obviously, too, the renewal process is far less expensive than removing and replacing an insert which had been rigidly secured to a hinge part. Thus, not only does my floating-washer type of hinge joint provide performance which is far superior to these prior arrangements, but also it is much simpler in construction and lends itself much more readily to renewal.

Although I have described successful tests in which a minor percentage of the washer material was of tungsten, my tests indicate that other additives having a melting point higher than the base metal of the washer could also be used successfully. Examples of such additives are nickel and molybdenum. These additives, like the tungsten, should constitute only a minor percentage by weight of the mixture. Nickel is an especially desirable additive in that it contributes appreciably to the tensile strength and toughness of the washer.

While I have shown and described particular embodiments of my invention, certain changes and modifications will be obvious to those skilled in the art, and I, therefore, intend in the appended claims to cover all such changes and modifications as fall within the true spirit and scope of my invention.

What I claim as new and desire to secure by Letters Patent of the United States is:

1. In a current-carrying hinge construction for electric apparatus, a pair of relatively-movable, juxtaposed contact members, transversely-extending pivot structure pivotally connecting said contact members, and a laterally-movable floating washer disposed between said contact members and mounted about said pivot structure with sufficient clearance to permit appreciable lateral and rotative movement of the washer with respect to said pivot structure in response to relative movement of said contact members, said washer having transversely-spaced faces of a highly conductive material intimately contacting said contact members in current-carrying relationship, relative pivotal movement of said contact members causing appreciable lateral and rotative movement of said washer with respect to said pivot structure.

2. In a current-carrying hinge construction for electric apparatus, a pair of relatively-movable juxtaposed contact members, transversely-extending pivot structure pivotally connecting said contact members, and a laterally-movable floating washer disposed between said contact members and mounted about said pivot structure with sufficient clearance to permit appreciable lateral and rotative movement of the washer with respect to said pivot structure in response to relative movement of said contact members, said washer having transversely-spaced faces intimately contacting said contact members in current-carrying relationship, said washer faces being composed of a highly conductive material which, when wiped by the surfaces of said contact members, has a lesser resistance to wear than the material of said surfaces, relative pivotal movement of said contact members causing appreciable lateral and rotative movement of said washer with respect to said pivot structure.

3. In a current-carrying hinge construction for electric apparatus, a pair of relatively-movable juxtaposed contact members, transversely-extending pivot structure pivotally connecting said contact members, a laterally-movable floating washer having transversely-spaced faces engaging said contact members and mounted about said pivot structure with sufficient clearance to permit appreciable lateral and rotative movement of the washer with respect to said pivot structure in response to relative movement of said contact members, and spring means resiliently urging said contact members into high-pressure, current-carrying engagement with the transversely-spaced faces of said washer, the forces exerted by said spring means being of a magnitude insufficient to prevent said lateral and rotative movement of the washer, relative pivotal movement of said contact members causing appreciable lateral and rotative movement of said washer with respect to said pivot structure.

4. The hinge construction of claim 1 in which the material of the washer faces contains a small percentage of free carbon not exceeding about three percent, by weight, of the material.

5. The hinge construction of claim 2 in which the material of the washer faces contains a small percentage of free carbon not exceeding about three percent, by weight, of the material.

6. The hinge construction of claim 1 in which the material of the washer faces is a sintered mixture composed of a highly conductive metallic substance and a small amount of free carbon not exceeding about three percent, by weight, of the mixture.

7. The hinge construction of claim 2 in which the material of the washer faces is a sintered mixture composed of a highly conductive metallic substance and a small amount of free carbon not exceeding about three percent, by weight, of the mixture.

8. The hinge construction of claim 1 in which the washer-contacted surfaces of said contact members are of silver and the material of said washer is a sintered mixture comprising a major percentage of silver and a small amount of free carbon not exceeding about three percent, by weight, of the mixture.

9. The hinge construction of claim 1 in which the washer faces are formed of a sintered mixture comprising a major percentage of highly-conductive metallic substance and a minor percentage of a weld-inhibiting agent.

10. The hinge construction of claim 1 in which the material of the washer faces is a sintered mixture composed of a major percentage of a highly conductive first metal, a minor percentage of a second metal of lower conductivity having a substantially higher melting point than said first metal, and a small amount of free carbon not exceeding about three percent, by weight, of the mixture.

11. The hinge construction of claim 10 in which said first metal is silver and said second metal is tungsten.

12. The hinge construction of claim 10 in which said first metal is silver and said second metal is nickel.

13. In an electric switch comprising a pair of relatively-movable, juxtaposed switch members connected together by transversely-extending pivot structure, one of said switch members being mounted for oscillation about said pivot structure, and a floating washer disposed between said switch members and mounted for appreciable lateral and rotative movement with respect to said pivot structure in response to relative movement between said switch members, said washer having transversely-spaced faces of a highly-conductive material intimately contacting said switch members in current-carrying relationship, relative pivotal movement of said contact members causing appreciable lateral and rotative movement of said washer with respect to said pivot structure.

References Cited in the file of this patent

UNITED STATES PATENTS

| | | |
|---|---|---|
| 2,237,283 | Baskerville et al. | Apr. 8, 1941 |
| 2,289,708 | Jackson | July 14, 1942 |
| 2,371,755 | Gilson | Mar. 20, 1945 |
| 2,730,594 | Page | Jan. 10, 1956 |
| 2,732,486 | Osowski | Jan. 24, 1956 |

FOREIGN PATENTS

| | | |
|---|---|---|
| 566,207 | Great Britain | Dec. 19, 1944 |